(12) United States Patent
Gross et al.

(10) Patent No.: US 10,484,094 B2
(45) Date of Patent: Nov. 19, 2019

(54) OPTICAL SIGNAL TRANSMISSION SYSTEM, A METHOD FOR TRANSMITTING A PLURALITY OF OPTICAL SIGNALS, AND A METHOD FOR MAKING A PHOTONIC DEVICE

(71) Applicant: Macquarie University, North Ryde, NSW (AU)

(72) Inventors: Simon Gross, Waverton (AU); Michael Withford, Ingleside (AU); Nicolas Riesen, Adelaide (AU)

(73) Assignee: Macquarie University, North Ryde, NSW (AU)

( * ) Notice: Subject to any disclaimer, the term of this patent is extended or adjusted under 35 U.S.C. 154(b) by 0 days.

(21) Appl. No.: 16/328,702

(22) PCT Filed: Aug. 30, 2017

(86) PCT No.: PCT/AU2017/050922
§ 371 (c)(1),
(2) Date: Feb. 26, 2019

(87) PCT Pub. No.: WO2018/039716
PCT Pub. Date: Mar. 8, 2018

(65) Prior Publication Data
US 2019/0199440 A1    Jun. 27, 2019

(30) Foreign Application Priority Data
Aug. 30, 2016  (AU) ................................. 2016903452

(51) Int. Cl.
*H04B 10/2581* (2013.01)
*H04J 14/02* (2006.01)
(Continued)

(52) U.S. Cl.
CPC ...... *H04B 10/2581* (2013.01); *H04J 14/0202* (2013.01); *H04J 14/04* (2013.01); *H04B 10/2503* (2013.01)

(58) Field of Classification Search
CPC ............. H04B 10/2581; H04B 10/2503; H04J 14/0202; H04J 14/04
(Continued)

(56) References Cited

U.S. PATENT DOCUMENTS

2004/0208447 A1* 10/2004 Ramadan ............... B82Y 20/00
                                                    385/39
2012/0207470 A1*  8/2012 Djordjevic ............ H04B 10/25
                                                    398/44
(Continued)

FOREIGN PATENT DOCUMENTS

EP        2 597 792 A1    5/2013

OTHER PUBLICATIONS

Richardson, D.J., "Space-division multiplexing in optical fibres," *nature photonics*, vol. 7, pp. 354-362 (Apr. 29, 2013).
(Continued)

*Primary Examiner* — Dalzid E Singh
(74) *Attorney, Agent, or Firm* — Christensen, Fonder, Dardi & Herbert PLLC

(57) ABSTRACT

An optical signal transmission system comprising a multimode optical fiber link. The multimode optical fiber link is for transmission of a plurality of optical signals in a plurality of spatial modes supported by the multimode optical fiber link. The optical signal transmission system comprises a photonic device in the form of a spatial mode add drop multiplexer coupled to the multimode optical fiber link and configured for at least one of coupling into the multimode optical fiber link an optical signal of the plurality of optical signals into a spatial mode of the plurality of spatial modes (Continued)

and coupling out of the multimode optical fiber link and into an optical fiber the optical signal of the spatial mode.

20 Claims, 15 Drawing Sheets

(51) Int. Cl.
    *H04J 14/04* (2006.01)
    *H04B 10/25* (2013.01)
(58) Field of Classification Search
    USPC .......................................................... 398/143
    See application file for complete search history.

(56) References Cited

U.S. PATENT DOCUMENTS

| | | | |
|---|---|---|---|
| 2013/0077967 A1 | 3/2013 | Woodward et al. | |
| 2013/0148963 A1* | 6/2013 | Cvijetic | H04J 14/04 398/45 |
| 2014/0140694 A1* | 5/2014 | Zhou | H04J 14/02 398/44 |
| 2014/0299743 A1* | 10/2014 | Miller | G02B 27/145 250/204 |
| 2015/0188659 A1* | 7/2015 | Lipson | H04J 14/04 398/44 |
| 2015/0349910 A1* | 12/2015 | Huang | H04J 14/00 398/44 |

OTHER PUBLICATIONS

Saridis, George M., "Survey and Evaluation of Space Division Multiplexing: From Technologies to Optical Networks," *IEEE Communications Surveys & Tutorials*, vol. 17, Issue 4, 23 pgs. (Sep. 2015).

Miller, David A.B., "Reconfigurable add-drop multiplexer for spatial modes," *Optics Express*, vol. 21, No. 17, 10 pgs. (Aug. 26, 2013).

Stern, Brian, et al., "On-chip mode-division multiplexing switch," *Optica*, vol. 2, No. 6, pp. 530-535 (Jun. 2015).

\* cited by examiner

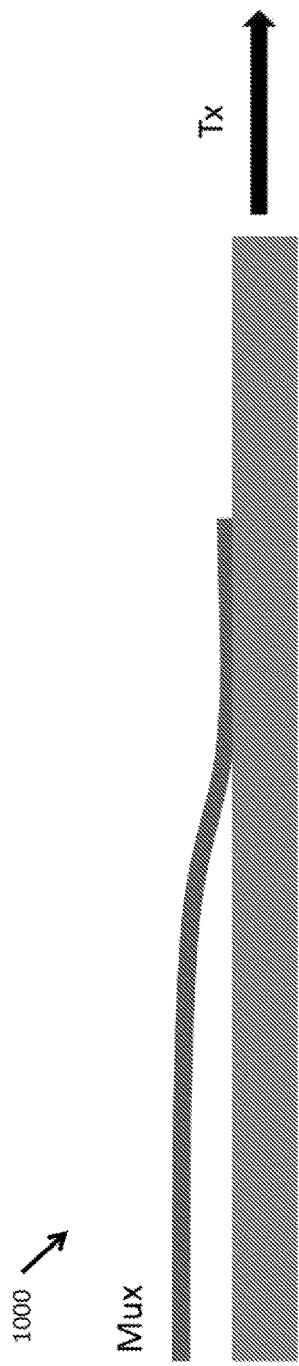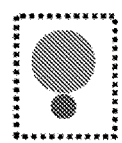

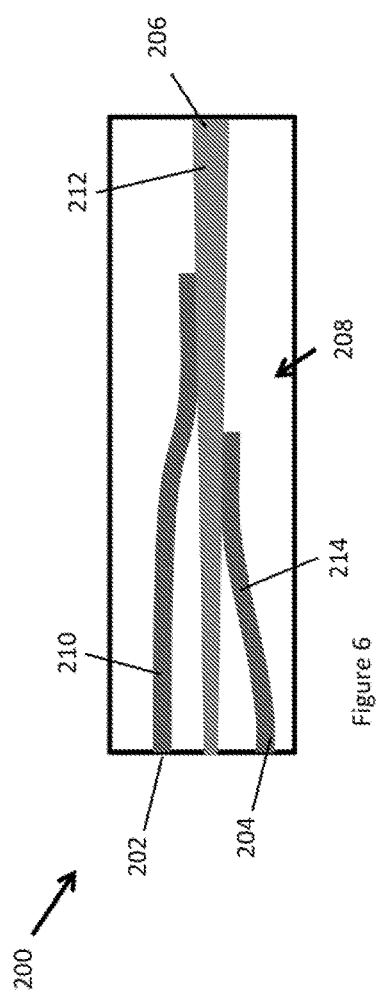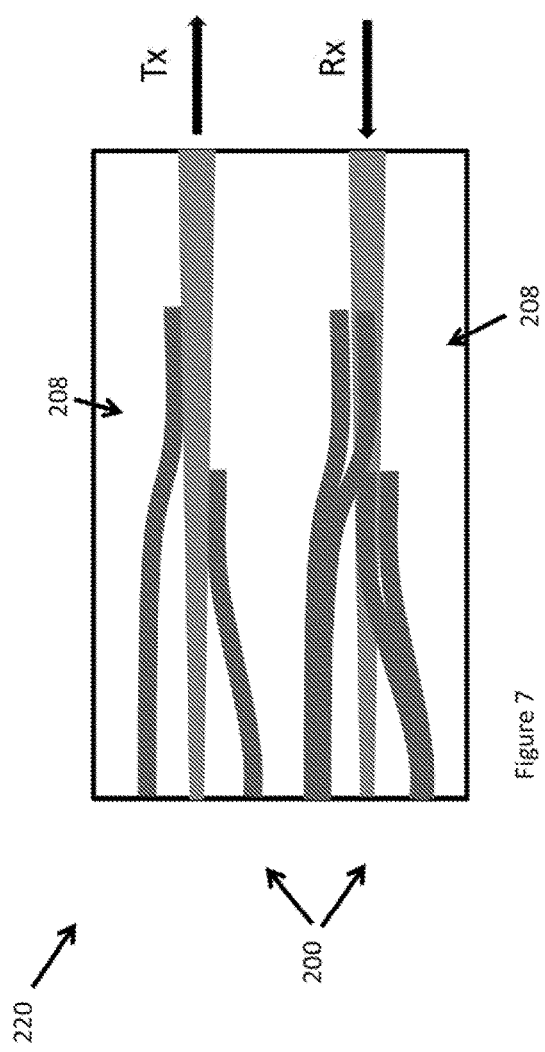

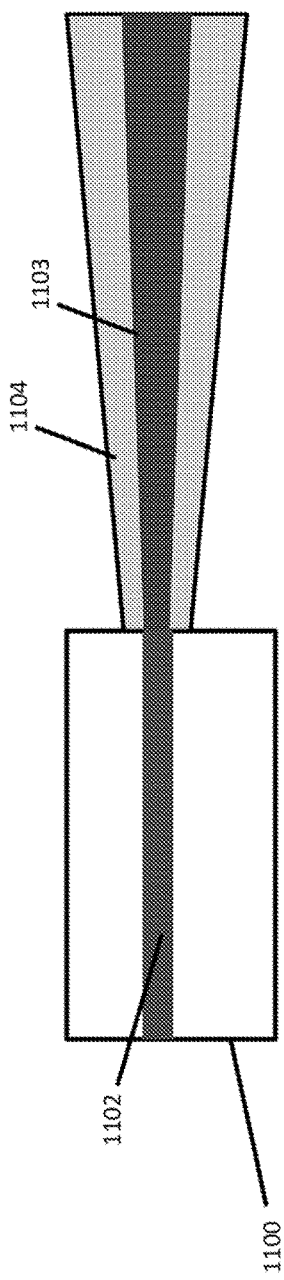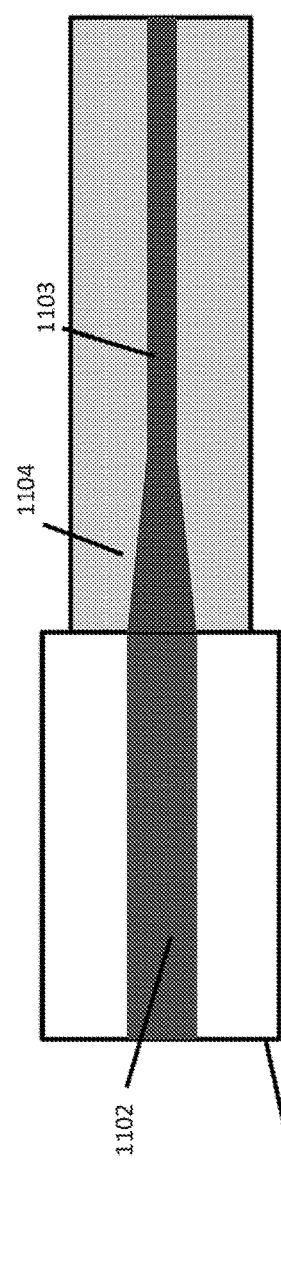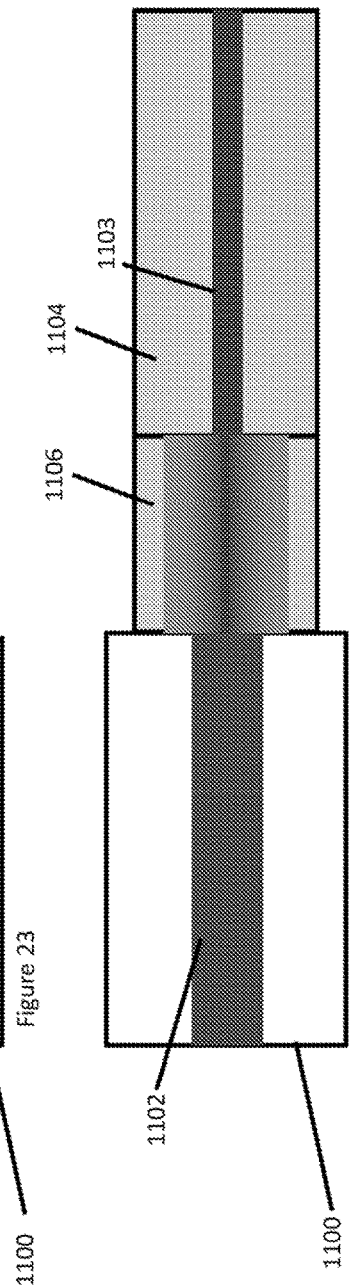

OPTICAL SIGNAL TRANSMISSION SYSTEM, A METHOD FOR TRANSMITTING A PLURALITY OF OPTICAL SIGNALS, AND A METHOD FOR MAKING A PHOTONIC DEVICE

PRIORITY CLAIM

The present application is a National Phase entry of PCT Application No. PCT/AU2017/050922, filed Aug. 30, 2017, which claims the benefit of Australian Patent Application No. 2016903452, filed Aug. 30, 2016, which are incorporated herein by reference.

FIELD OF THE INVENTION

The disclosure herein generally relates to an optical signal transmission system, a method for transmitting a plurality of optical signals, and a method for making a photonic device.

BACKGROUND

Multimode fiber may be used, for example, for super computer interconnects, within data centers, local area networks, or other applications requiring relatively short point-to-point link lengths. Examples of multimode fiber include but are not limited to 62.5 μm and 50 μm core-diameter multimode optical fibers, step index multimode fibers, graded index multimode fibers (examples of which include but are not limited to OM1 and OM2/3/4), and optical fibers that support only two, three or more modes.

Generally, in use many or all of the multimode fiber's plurality of spatial modes are excited with the same optical signal. Symbols within the optical signal are increasingly dispersed with propagation distance because some of the plurality of spatial modes have different group delay. This results in inter symbol interference that may limit transmission to a few hundred meters, for example.

The plurality of spatial modes that a multimode optical fiber supports may depend on the geometry, index contrast, and other parameters. A multimode fiber that only supports no more than a few spatial modes is commonly known as a "few moded fiber". Example conventional labels for a selection of spatial modes that may be found in a multimode fiber include: $LP_{01}$ (the fundamental mode), $LP_{11}$, $LP_{21}$, $LP_{02}$, $LP_{31}$, $LP_{12}$, $LP_{41}$, $LP_{22}$, $LP_{03}$, $LP_{51}$, $LP_{32}$, $LP_{61}$, $LP_{13}$, and $LP_{42}$ (higher order modes), and degeneracies thereof, for example $LP_{11a}$ and $LP_{11b}$. FIGS. 1 and 2 shows graphs of normalized propagation constants versus the fiber parameter for each of the above mentioned modes.

Most optical signal transmission systems of relatively longer length use an optical fiber that supports a single spatial mode to eliminate the above mentioned source of inter symbol interference.

It has been appreciated, however, that the information carrying capacity of an optical signal transmission link may be increased by using multimode optical fiber in a non-traditional manner. The plurality of spatial modes of some graded index multimode optical fiber may be arranged into spatial mode groups. In one definition of spatial mode groups, each spatial mode group may comprise spatial modes with approximately the same phase constant and group delay. Consequently, modes within a mode group may couple easily. The coupling between two modes of two groups, however, may be significantly less. Spatial mode groups may be defined in other ways. Over some distance, it may be possible to consider all mode members of a mode group as part of the same channel to form a spatial mode group division multiplexed system. Inter symbol interference within each channel may be significantly less than traditionally experienced in multimode fiber links, which may be exploited for increasing the data rate per channel or increasing the link length.

In a circularly symmetric multimode optical fiber, linear polarisation modes $LP_{lm}$ are determined by their azimuthal order l and their radial order m. At least some modes with the mode number n satisfying the equation $n=l+2m+1$ may have approximately the same phase constant and group delay and may belong to a mode group with order n.

For example, mode group 1 generally may comprise the $LP_{01}$ spatial mode, which is the fundamental (zero order) mode. The second mode group may generally comprise $LP_{11a}$ and $LP_{11b}$ spatial modes. Some but not all multimode fibers support a third mode group comprising $LP_{02}$, $LP_{21a}$ and $LP_{21b}$ spatial modes. Some multimode optical fibers comprise other mode groups that comprise further higher order modes. Multimode optical fibers with a diameter of 50 μm, for example, may have approximately 9-10 mode groups.

Practical means to individually excite the plurality of spatial mode groups of the multimode fiber, and optically isolate each of the plurality of spatial mode groups are required.

SUMMARY

Disclosed herein is an optical signal transmission system. The system comprises a multimode optical fiber link for transmission of a plurality of optical signals in a plurality of spatial modes supported by the multimode optical fiber link. The system comprises a spatial mode add drop multiplexer optically coupled to the multimode optical fiber link for at least one of coupling into the multimode optical fiber link an optical signal of the plurality of optical signals into a spatial mode of the plurality of spatial modes and selectively coupling out of the multimode optical fiber link the optical signal of the spatial mode, wherein the spatial mode add drop multiplexer comprises a photonic chip.

In an embodiment, the spatial mode add drop multiplexer is configured for selectively coupling out of the multimode optical fiber link and into an optical fiber the optical signal of the spatial mode.

In an embodiment, the photonic chip comprises a waveguide network configured for at least one of coupling into the multimode fiber optical link the optical signal and selectively coupling out of the multimode optical fiber link the optical signal.

An embodiment comprises an input optical fiber optically coupled to the waveguide network for launching the optical signal into the waveguide network.

In an embodiment, the input optical fiber comprises at least one of a single mode input optical fiber and a multimode input optical fiber.

In an embodiment, the multimode input optical fiber comprises a few mode input optical fiber.

An embodiment comprises an output optical fiber optically coupled to the waveguide network for receiving the optical signal when selectively coupled out of the waveguide network.

In an embodiment, the output optical fiber comprises at least one of a single mode output optical fiber and a multimode output optical fiber.

In an embodiment, the multimode output optical fiber comprises a few mode output optical fiber.

In an embodiment, the waveguide network comprises at least one of a mode selective tapered coupler, a mode selective photonic lantern, and an asymmetric directional coupler.

In an embodiment, the waveguide network is a laser written waveguide network.

An embodiment comprises a plurality of spatial mode add drop multiplexers optically coupled to the multimode optical fiber link, wherein the spatial mode add drop multiplexer is one of the plurality of spatial mode add drop multiplexers.

An embodiment comprises a spatial mode multiplexer optically coupled to the multimode optical fiber link and configured for coupling into the multimode optical fiber link at least some of the plurality of optical signals into at least some of the plurality of spatial modes.

In an embodiment, the spatial mode multiplexer is optically coupled to a plurality of optical transmitters.

An embodiment comprises a spatial mode de-multiplexer coupled to the multimode optical fiber link and configured for selectively coupling out of the multimode optical fiber link at least some of the plurality of optical signals in at least some of the plurality of spatial modes.

In an embodiment, the spatial mode de-multiplexer is optically coupled to a plurality of optical receivers.

In an embodiment, the spatial mode add drop multiplexer is for at least one of coupling into the multimode fiber link the optical signal of the plurality of optical signals into a spatial mode group of a plurality of spatial mode groups supported by the multimode optical fiber link and selectively coupling out of the multimode optical fiber link the optical signal of the spatial mode group.

An embodiment comprises a spatial mode add drop demultiplexer configured for selectively coupling out of the multimode optical fiber link the optical signal of the spatial mode group.

Disclosed herein is a method for transmitting a plurality of optical signals. The method comprises the step of using a spatial mode add drop multiplexer coupled to a multimode optical fiber link that supports a plurality of spatial modes to either couple into the multimode optical fiber link an optical signal of the plurality of optical signals into a spatial mode of the plurality of spatial mode groups or coupling out of the multimode optical fiber link the optical signal of the spatial mode, wherein the spatial mode add drop multiplexer comprises a photonic chip.

In an embodiment, the spatial mode add drop multiplexer may be used to couple out of the multimode optical fiber link and into an optical fiber the optical signal.

In an embodiment, the photonic chip comprises a waveguide network configured for at least one of coupling into the multimode fiber optical link the optical signal and selectively coupling out of the multimode optical fiber link the optical signal.

In an embodiment, the waveguide network comprises at least one of a mode selective tapered coupler, a mode selective photonic lantern, and an asymmetric directional coupler.

In an embodiment, the waveguide network is a laser written waveguide network.

An embodiment comprises a plurality of spatial mode add drop multiplexers coupled to the multimode optical fiber link wherein the spatial mode add drop multiplexer in one of a plurality of spatial mode add drop multiplexers.

An embodiment comprises a spatial mode multiplexer coupled to the multimode optical fiber link to couple into the multimode optical fiber at least some of the plurality of optical signals into at least some of the plurality of spatial modes.

An embodiment comprises using a spatial mode de-multiplexer coupled to the multimode optical fiber link to selectively couple out of the multimode optical fiber link at least some of the plurality of optical signals in at least some of the plurality of spatial modes into a plurality of respective optical fibers.

Disclosed herein in a method for making a photonic device, the method comprising the step of focusing a laser to a focal spot within a piece of optical material to change the refractive index of the optical material at the focus of the laser. The method comprises the step of translating at least one of the focal spot and the optical material to form a waveguide network within the piece of optical material.

In an embodiment, the waveguide network comprises at least one of a mode selective tapered coupler, a mode selective photonic lantern, and an asymmetric directional coupler.

Disclosed herein is a photonic device comprising a photonic chip comprising a waveguide network. The waveguide network is configured for at least one of coupling into a multimode fiber optical link an optical signal into one of a plurality of spatial modes supported by the multimode optical fiber link and selectively coupling out of the multimode optical fiber link the optical signal of the spatial mode.

In an embodiment, the waveguide network comprises at least one of a mode selective tapered coupler, a mode selective photonic lantern, and an asymmetric directional coupler.

In an embodiment, the waveguide network is a laser written waveguide network.

In an embodiment, the optical material comprises glass.

In an embodiment, the optical material may comprise an optical chip.

In the context of this document:
"multi" means more than one; and
"few" means "two to four".

Any of the various features of each of the above disclosures, and of the various features of the embodiments described below, can be combined as suitable and desired.

BRIEF DESCRIPTION OF THE DRAWINGS

Embodiments will now be described by way of example only with reference to the accompanying figures in which:

FIG. 4 shows a schematic diagram of an example of an asymmetric directional mode coupler.

FIG. 5 is a cross section of the coupler of FIG. 4.

FIG. 6 shows a schematic diagram of an embodiment of a photonic device.

FIG. 7 shows a schematic diagram of another embodiment of a photonic device.

FIG. 10 shows a schematic diagram of another example of an asymmetric directional mode coupler.

FIG. 11 is a cross section of the coupler of FIG. 10.

FIGS. 22-25 show schematic diagrams of various couplings of a photonic device.

DETAILED DESCRIPTION

Figure 1:
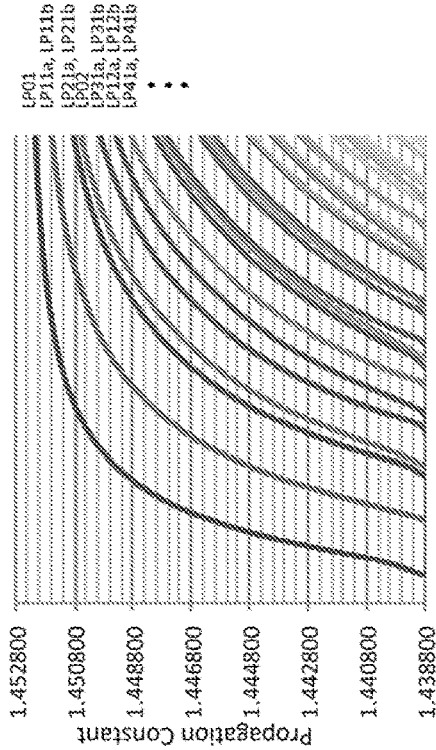
FIGS. 1 and 2 show graphs of normalized propagation constants versus fiber parameter for some modes in step-index multimode optical fiber and graded-index multimode optical fiber respectively.
Figure 2:
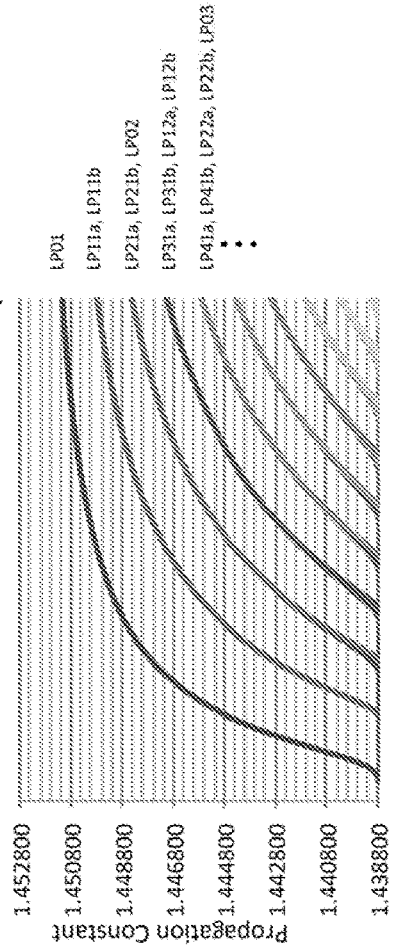
Figure 3:
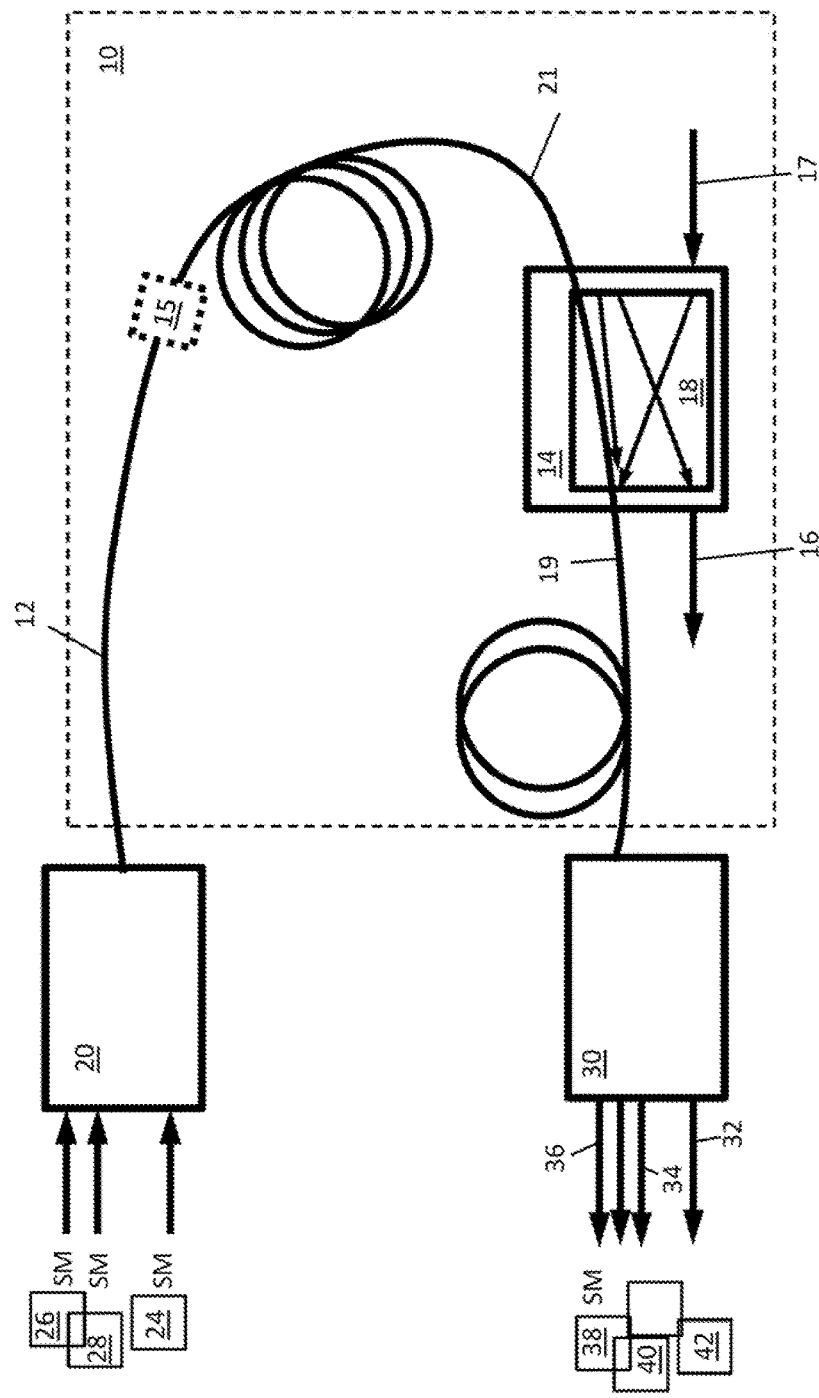
FIG. 3 shows a schematic diagram of an embodiment of an optical signal transmission system.

FIG. 3 shows a schematic diagram of an embodiment of an optical signal transmission system generally indicated by the numeral 10. The optical signal transmission system 10 comprises a multimode optical fiber link 12 comprising at least one length of multimode fiber. The multimode optical fiber link 12 is for transmission of a plurality of optical signals in a plurality of spatial modes supported by the multimode optical fiber link 12. The optical signal transmission system 10 comprises a photonic device in the form of a spatial mode add drop multiplexer 14 optically coupled to the multimode optical fiber link 12 and for at least one of coupling into the multimode optical fiber link 12 an optical signal of the plurality of optical signals into a spatial mode of the plurality of spatial modes or selectively coupling out of the multimode optical fiber link 12 the optical signal of the spatial mode. The spatial mode add drop multiplexer 14 comprises a photonic chip 18.

In the present but not necessarily all embodiments, the optical signal is, when selectively coupled out, coupled into an optical fiber 16 in the form of a conectorized fiber pigtail. The fiber pigtail is connectorized so that it may be coupled to a connectorized end of a length of multimode optical fiber. The optical fiber 16 is in the present embodiment a singled moded optical fiber in the form of a single moded optical signal drop fiber, however it may be a multimoded fiber, for example a few moded fiber or many moded fiber. The spatial mode add drop multiplexer 14 has a single moded signal add optical fiber 17 for coupling into the multimoded optical fiber link 12, however the optical fiber 17 may be multimoded, for example a few moded optical fiber or a many moded optical fiber.

In use, the plurality of optical signals may be each in a respective spatial mode group.

Embodiments may comprise a plurality of photonic devices in the form of a plurality of spatial mode add drop multiplexers 14, 15 coupled to the multimode optical fiber link 12. The plurality of spatial mode add drop multiplexers 14, 15 are generally, but not necessarily, each in-line with the multimode optical fiber link 12. That is, the multimode optical fiber link comprises a path through each of the plurality of spatial mode add drop multiplexers 14, 15. The plurality of add drop multiplexers 14, 15 may each be configured to, for each of a plurality of communication network nodes, selectively couple out (drop) a different optical signal of the plurality of optical signals of the plurality of spatial modes. The plurality of add drop multiplexers may additionally couple into the optical fiber link 12 (add) different optical signals of the plurality of optical signals from each of the plurality of communication network nodes into a different one of the plurality of spatial modes.

An embodiment further comprises another photonic device in the form of a spatial mode multiplexer 20 coupled to the multimode optical fiber link 12 and configured for coupling into the multimode optical fiber link 12 the plurality of optical signals into the plurality of spatial modes (or spatial mode groups). The spatial mode multiplexer 20 is in the present embodiment optically coupled to a plurality of optical transmitters 24, 26, 28 each in the form of a semiconductor laser diode configured to be modulated by an electrical signal. The spatial mode multiplexer 20 comprises a photonic chip.

An embodiment further comprises yet another photonic device in the form of a spatial mode de-multiplexer 30 coupled to the multimode optical fiber link 12 and configured for coupling out of the multimode optical fiber link 12 at least some of the plurality of optical signals in at least some of the plurality of spatial modes. The spatial mode demultiplexer may, as in the present embodiment, couple at least some of the spatial modes into a plurality of respective optical fibers 32, 34, 36. The spatial mode de-multiplexer 20 may be optically coupled to a plurality of optical receivers 38, 40, 42, for example by the optical fibers 32, 34, 36 in the form of single mode optical fiber, or alternatively multimode optical fiber, or free space propagation and/or bulk optics, for example. The spatial mode multiplexer 30 comprises a photonic chip. Generally, but not necessarily, the plurality of optical signals are coupled into respective ones of the plurality of spatial modes.

The optical signal transmission system 10 of FIG. 3, but not all embodiments, is passive and accepts data streams on single mode fibers, for example, and multiplexes them, onto individual spatial modes or spatial mode-groups of a multimode optical fiber. The reach of multimode fiber transmission links may be enhanced because differential group delay imposed limitations on data rate and link length are circumvented.

FIG. 4 shows a schematic diagram of an example of an asymmetric directional mode coupler 1000 in the form of a multiplexer that may be used in examples of the photonic devices, for example the spatial mode multiplexers, demultiplexers, and add-drop multiplexers disclosed herein. FIG. 5 is a cross section of the coupling region of the coupler 1000 of FIG. 4. The coupler 1000 is not tapered. Phase matching between the different modes in adjacent waveguides is controlled by adjusting the dimensions and/or index contrasts of the waveguides. The cross sections of individual waveguides generally may not vary. The ends of the waveguides may be tapered down to support a single mode for coupling with standard single mode fiber, for example. The taper may be an index or geometrical taper, for example. Cascade or tree-like structures consisting of a plurality of couplers 1000 may be used to address multiple modes in sequence or parallel.

FIG. 6 shows a schematic diagram of an embodiment of a photonic device 200, in the form of a photonic chip, in this embodiment an integrated photonic chip, for multiplexing and de-multiplexing and as such may be either one of the spatial mode multiplexer 20, the spatial mode de-multiplexer 30, or the add-drop multiplexer 14. The individual modes or mode-groups of the link 12 are excited and detected using the photonic devices for multiplexing 20 and de-multiplexing 30, which in the present but not all embodiments are similar or identical. The photonic device 200 has a plurality of single spatial mode ports 202, 204. Only a single mode in a mode group may be excited by light launched in one of the single spatial mode ports 202, 204. While this embodiment couples into two spatial modes corresponding to ports 202 and 204, other embodiments have more than 2 ports for coupling into more than two spatial modes.

The single spatial mode ports 202, 204 may be for optically coupling to a plurality of single spatial-mode fibers ("single-mode fiber"), for example. The photonic device 200 has a multi-spatial mode port 206. The multi-spatial mode port 206 may be for optically coupling to a multimode fiber, for example the optical fiber link 12. Each single spatial mode port may be for a mode group or a single mode. The photonic device 200 comprises a coupler 208 comprising a plurality of waveguides in optical communication with the plurality of single spatial mode ports 202, 204 and the multi-spatial mode port 206. The coupler may be, for example, a mode-selective tapered coupler or photonic lantern. Alternatively, the coupler may be an asymmetric directional coupler, for example as shown in FIG. 10.

The coupler 200 is configured to couple light launched in each of the plurality of single spatial-mode ports to an associated one of the spatial modes or mode groups of the multi-spatial mode port 206, or vice versa. For de-multiplexing, each mode (taking degeneracy into account) may be coupled into a single-mode waveguide. These single-mode waveguides may be recombined to be either coupled onto a detector or into a few/multi-mode optical fiber. This recombination can again be by some extra mode couplers such as tapered, asymmetric or photonic lantern (in this case the photonic lantern may not need to be mode-selective).

FIG. 7 shows a schematic diagram of another embodiment of a photonic device 220, in the form of an integrated photonic chip, for multiplexing and de-multiplexing. The device comprises two photonic devices 200 of FIG. 6 for bi-directional operation.

Figure 8:
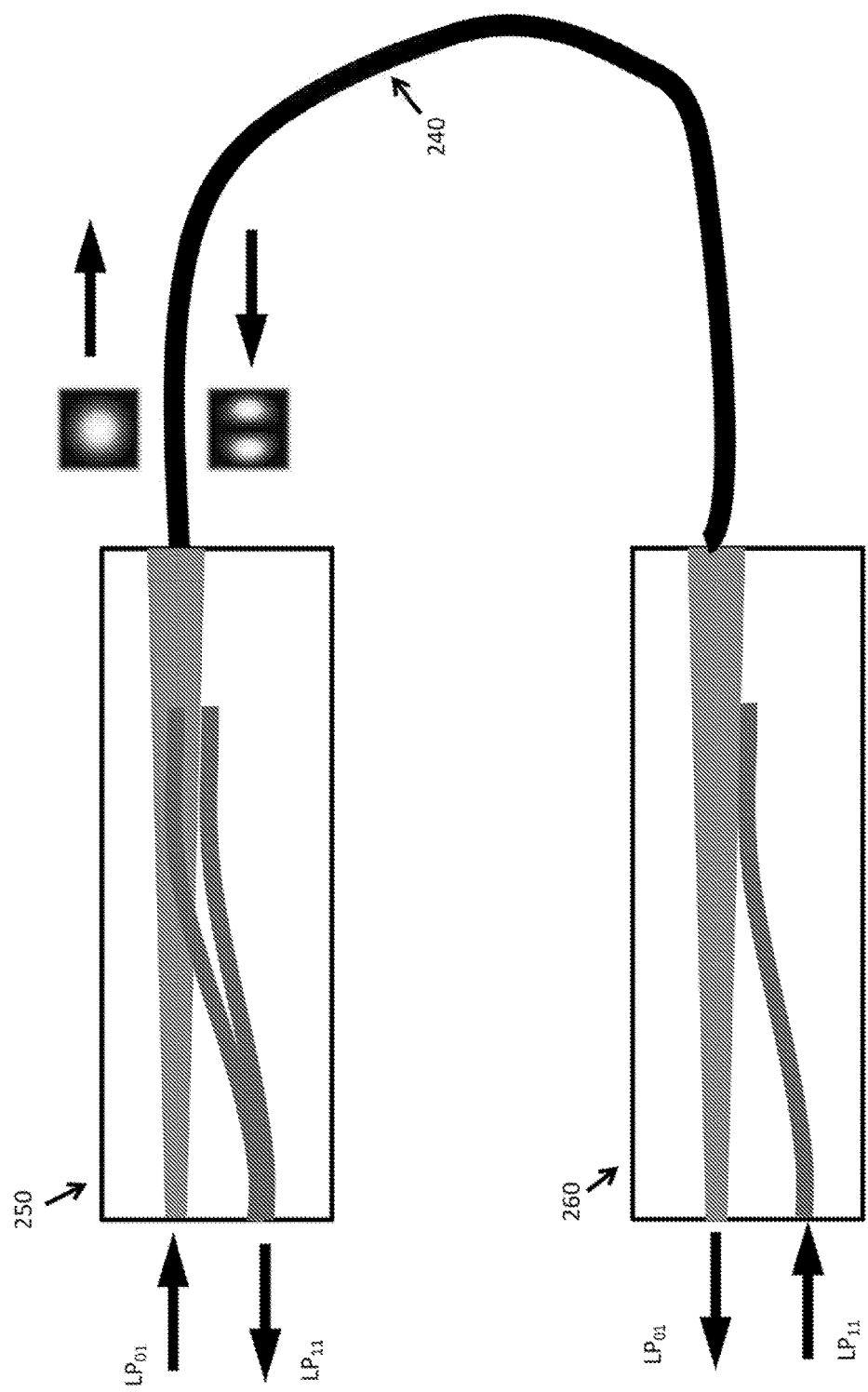
FIG. 8 a schematic diagram showing an example of bi-directional communication across a single few-mode or multimode fiber.

FIG. 8 is a schematic diagram showing an example of bi-directional communication across a single few-mode or multimode fiber 240, using glass chip photonic devices 250, 260 as generally described herein. In this example the $LP_{01}$ mode is used in one communication direction within the fiber and the $LP_{11}$ mode is used on another communication direction within the fiber.

Figure 9:
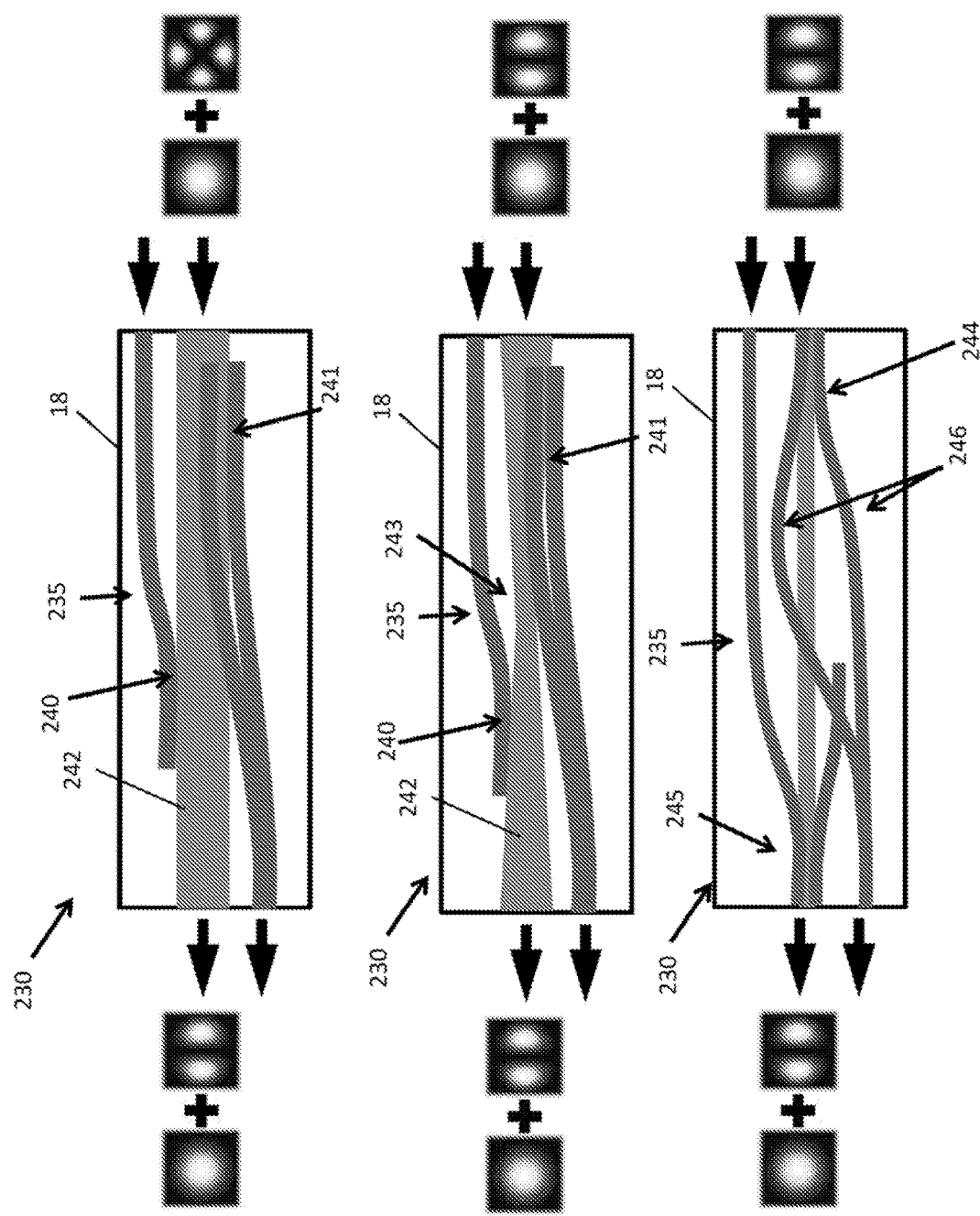
FIG. 9 shows a schematic diagram of several alternative embodiments of a photonic device.

FIG. 9 shows a schematic diagram of several alternative embodiments of a photonic device 230 in the form of an add-drop multiplexer. The add-drop multiplexer 230 may be used to add or remove optical signals to/from the multimode optical link 12. The add-drop multiplexer 230 may de-multiplex one particular mode and add a new optical signal carrying a data stream on the same mode (or mode-group). The add/-drop multiplexer may add a new optical signal carrying a data stream to an unused higher order mode (or mode-group). The add-drop multiplexer may de-multiplex one particular mode and add a new optical signal carrying a data stream on an unused spatial mode or spatial mode-group. The photonic device 230 may not be limited to just adding and dropping a single data stream (i.e. mode), but may add or drop several modes.

The photonic chip 18 of the add-drop multiplexer 230 comprises a waveguide network 235. The waveguide network 235 may alternatively comprise, for example, a mode-selective directional coupler (top), tapered velocity coupler (middle) and/or photonic lantern (bottom).

In more detail, in FIG. 9 (top) shows one continuous multimode or few-moded waveguide, as are several single-mode waveguides to form several mode-selective asymmetric mode-selective couplers. The multiplexer drops the data in the $LP_{21}$ mode and adds a data stream onto the previously unused $LP_{11}$ mode. Coupler 241 drops an first optical signal carrying a data stream from the few-moded or multimoded waveguide 242. Coupler 240 adds a second optical signal carrying a data stream to the waveguide 242. The first optical signal and the second optical signal on two separate modes or mode groups enter the waveguide 242. Light contained in the higher order mode is multiplexed, while another data stream is coupled on another mode or mode group. In FIG. 9 (middle) shows a tapered velocity coupler. The multimode waveguide can contain one or several up- and down-tapers. If the higher order mode is dropped, it may be beneficial to taper the waveguide down, so that all light that may remain in the highest order modes is removed before another data stream is added or removed. In this particular example the $LP_{11}$ is dropped and another data stream is added as $LP_{11}$ to the optical fiber link 12. A taper in the middle performs mode-cleaning. Coupler 241 drops a first optical signal carrying a data stream from a higher order mode or mode-group. Coupler 240 adds a second optical signal carrying a data stream to the same higher order mode or mode-group. Waveguide 242 comprises a taper 243, configured such that a selected higher order mode is not guided therein, and any light that has not been coupled out of the higher order mode by the first coupler 241 is removed before a second optical signal carrying a data stream is added to the waveguide 242. In FIG. 9 (bottom) shows a mode-selective photonics lantern based add/drop multiplexer. All modes may be first de-multiplexed into single-mode channels. The $LP_{11}$ mode is dropped and another data stream is added to the $LP_{11}$ in the second lantern. There are a plurality (2) of mode-selective or group selective photonic lanterns. Photonic lantern 244 at the input multiplexes all modes into a plurality of single-mode waveguides 246. Single-mode waveguides for data contained on modes that should not be dropped or new data that is being added are routed such that they form a second photonic lantern at the output 245. Optical signals on modes that should be dropped are routed away may be launched into at least one separate optical fiber.

FIG. 10 shows a schematic diagram of an example of an asymmetric directional mode coupler 1002 in the form of a de-multiplexer or multiplexer ($LP_{lm}$ mode, $l \geq 1$). FIG. 11 is a cross section in the coupling region of the coupler of FIG. 10. The coupler 1002 is non tapered in the coupling region. Phase matching between the different modes in adjacent waveguides is controlled by adjusting the dimensions and index contrasts of the waveguides. The cross sections of individual waveguides generally may not vary. The ends of the waveguides may be tapered down to support a single mode for coupling with standard single mode fiber, for example. The taper may be an index or geometrical taper, for example. Cascade or tree-like structures consisting of a plurality of couplers 1002 and 1000 in reverse may be used to de-multiplex multiple modes in sequence or parallel. The angular offset of waveguides in a coupling region is $\Phi = \pi/2l \pm n\pi/l$, where n is a cardinal number.

Figure 12:
FIGS. 12 and 13 are schematic diagrams of examples of tapered directional mode selective couplers.
Figure 14:
FIGS. 14 and 15 shows cross sections of the couplers of FIGS. 12 and 13 respectively.
Figure 13:
Figure 15:

FIGS. 12 and 13 are schematic diagrams of examples of tapered directional mode selective couplers in the form of a multiplexer and de-multiplexer respectively. FIGS. 14 and 15 show cross sections of the couplers of FIGS. 12 and 13 respectively. A taper may be an index or geometrical taper, for example. Any number of waveguides may be coupled. If there are more than one waveguide then they may be counter-tapered. The tapering is gradual, that is approximately adiabatic. The mode coupling with adjacent waveguides is phase-matched. A second outer core may be included as well, if both orientation states of an $LP_{lm}$ ($l \geq 1$) mode are to be excited or separated. The ends of the waveguides may be tapered down to support a single mode for coupling with standard single mode fiber, for example. Cascade or tree-like structures consisting of a plurality of couplers may be used to address multiple modes in sequence or parallel. The angular offset of waveguides in a coupling region is $\Phi = \pi/2l \pm n\pi/l$, where n is a cardinal number.

Figure 16:
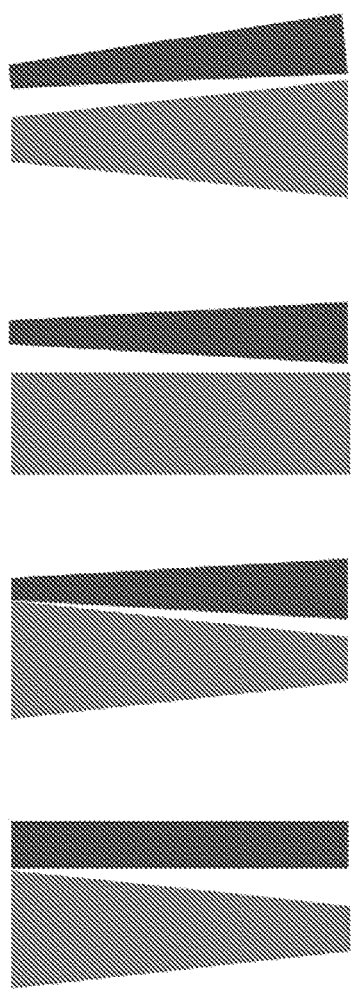
FIG. 16 shows a detail of tapered coupler coupling regions for various taper configurations for 2-core couplers.
Figure 17:
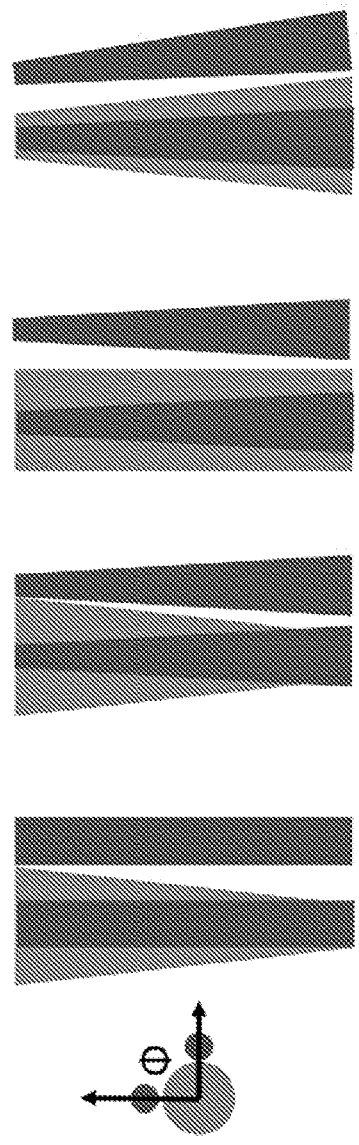
FIG. 17 shows a detail of tapered coupler coupling regions for various taper configuration for 3-core couplers.

FIG. 16 shows a detail of tapered mode selective coupler coupling regions for various taper configurations for 2-core couplers. The axes of the waveguides may be parallel or at an angle relative to each other. From left to right, the multimode waveguide is tapered and the single mode waveguide is not tapered, the multimode waveguide and the single mode waveguide are tapered in opposite directions, the multimode waveguide is not tapered and the single mode waveguide is tapered, and the multimode waveguide is tapered and the single mode waveguide are tapered in the same direction. FIG. 17 shows a detail of tapered coupler coupling regions for various taper configuration for 3-core couplers. From left to right, the multimode fiber is tapered and the single mode fiber is not tapered, the multimode fiber and the single mode fiber are tapered in opposite directions, the multimode fiber and the single mode fiber and tapered in the same direction, and the multimode fiber and the single mode fiber are tapered in the same directions. The two outer cores may have different index, dimensions, taper ratios and taper directions, for example if the degeneracy of the mode orientation states is lifted.

Figure 20:
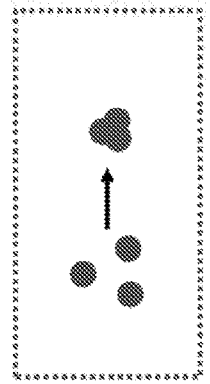
FIGS. 20 and 21 show cross sections for the asymmetric Y-junctions of FIGS. 18 and 19 respectively.
Figure 21:
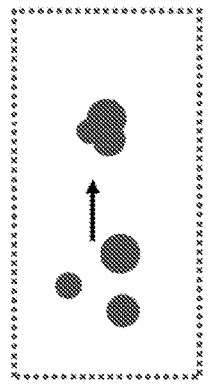
Figure 18:
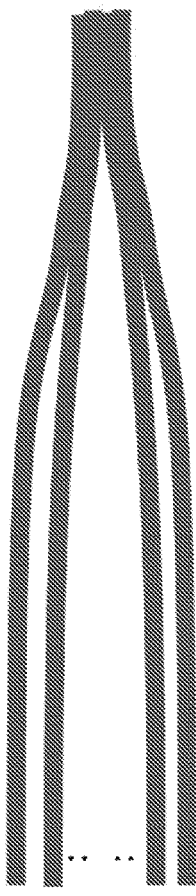
FIGS. 18 and 19 are schematic diagrams of examples of asymmetric Y-junctions.
Figure 19:
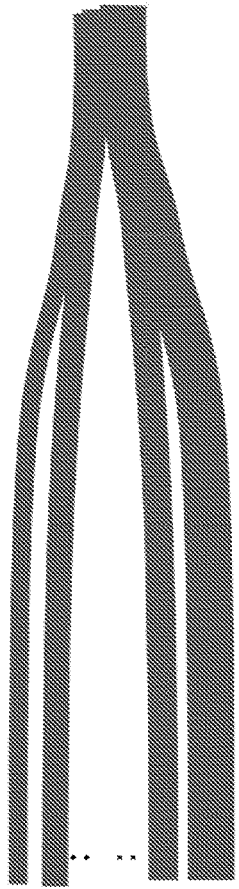

FIGS. 18 and 19 are schematic diagrams of examples of asymmetric Y-junctions having identical cores and dissimilar cores respectively, also known as multi-pronged mode splitters or photonic lanterns. FIGS. 20 and 21 show cross sections for the asymmetric Y-junctions of FIGS. 18 and 19 respectively. The asymmetric Y-junctions may have a two dimensional or three dimensional configurations of single-mode waveguides merging into a single multimode waveguide. The merge may be with or without tapering of the core diameter or index contrast. M single mode cores may merge into a N-mode waveguide. Ideally, M=N, otherwise outages may result. The configuration of the cores provides a superposition of LP modes in the multimode waveguide to be excited. The geometry may resemble LP mode shapes to provide near-lossless transition of modes. The use of dissimilar cores may provide one-to-one coupling or mode group selective coupling. A two dimensional or three dimensional arrangement of the cores may be tailored to ensure excitation of all modes in the multimode waveguide with a very low loss transition. The asymmetric Y-junctions or different-core photonic lanterns may be written into the optical material using a multiscan technique.

Generally, any photonic chip mode-sorting devices and techniques may be used, for example multi-mode interference (MMI) devices, grating assisted couplers etc.

FIGS. 22-25 show schematic diagrams of various couplings of a photonic device 1100 similar to that of photonic device 200 to an external optical fiber 1104, where similar parts are similarly numbered. As shown in FIG. 22, if the waveguide 1102 and the optical fiber 1104 have the same numerical aperture but the optical fiber 1104 supports a larger number of modes than the waveguide 1102, then the fiber 1104 may be physically tapered down to match the waveguide 1102. The tapering may improve the coupling efficiency and provides the mode-filtering effect. Mode-filtering avoids coupling into unwanted higher order modes. Generally, but not necessarily, the taper is between 5 mm and 20 mm in length. As shown in FIG. 23, if the fiber 1104 has a higher numerical aperture than the waveguide 1102 but they both support the same number of modes, then the core 1103 of the fiber 1104 may be for example thermally expanded to reduce its numerical aperture. As shown in FIG. 24, if the fiber 1104 has a higher numerical aperture but supports the same number of modes, then a piece of graded-index fiber or lens 1106 may be disposed between the fiber 1104 and the waveguide 1100. The length of graded-index fiber may be generally in between 0.25-0.5 times the pitch or the length plus cardinal multiples of 0.5 times the pitch.

Figure 25:
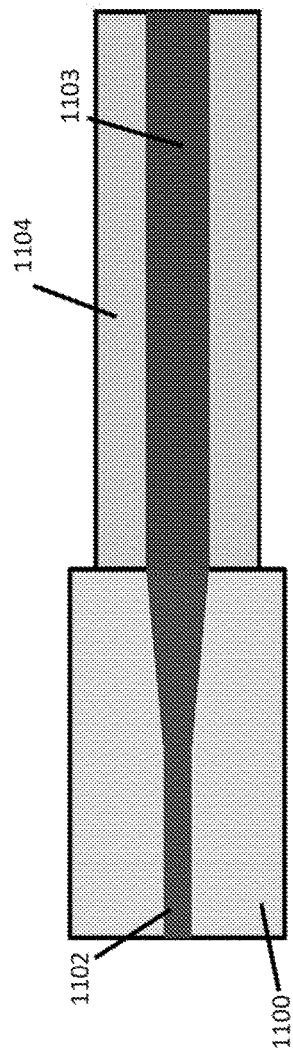

Alternatively, as shown in FIG. 25, a waveguide 1102 within the photonic chip 1100 may be tapered. In FIG. 25, the waveguide 1102 and fiber core 1103 have similar numerical apertures, but the fiber core is larger than the waveguide and thus supports a larger number of modes. The waveguide 1102 is tapered to match the fiber core size. The taper may be a dimensional taper and/or an index contrast taper.

A combination of the above described tapering techniques may be used. For example, if the fiber numerical aperture is larger than the waveguide numerical aperture and the fiber supports a large number of modes, then the fiber core may be thermally expanded and the fiber subsequently tapered.

Figure 26:
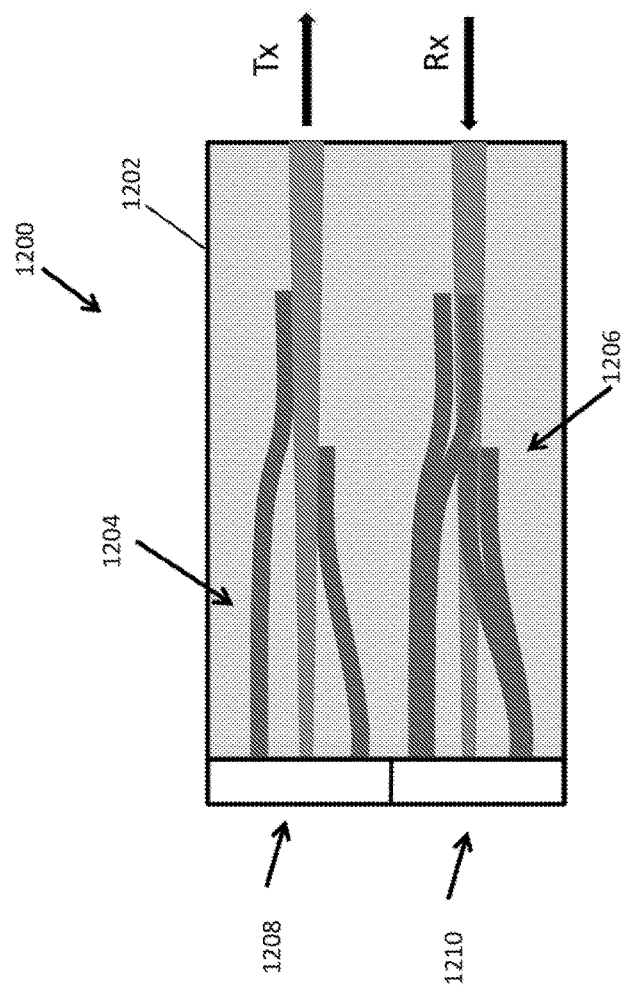
FIG. 26 shows an embodiment of an integrated photonic device.

FIG. 26 shows an embodiment of an integrated photonic device 1200 comprising a photonic chip 1202 comprising a spatial mode multiplexer 1204 and a spatial mode de-multiplexer 1206. The integrated photonic device comprises an optical receiver 1210 and an optical transmitter 1208. The optical receiver 1210 may be a photodiode or an array of photodiodes, for example.

Figure 27:
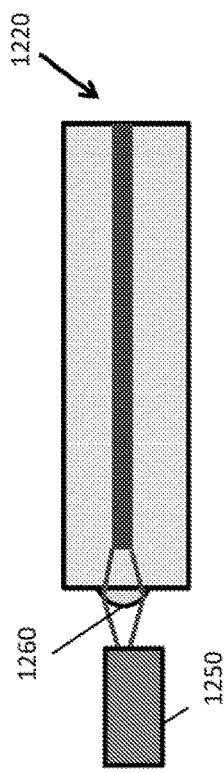
FIG. 27-29 show other various embodiments of integrated photonic devices.
Figure 28:
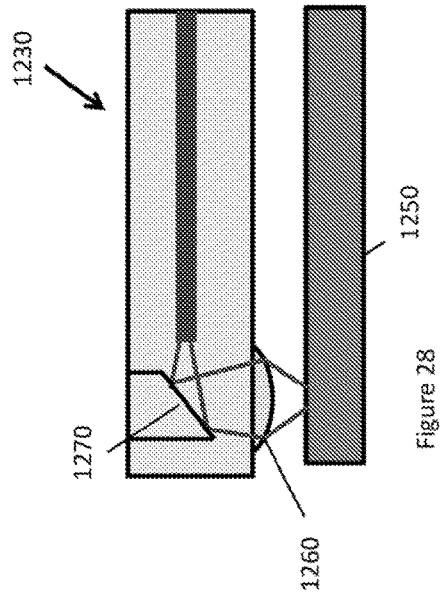
Figure 29:
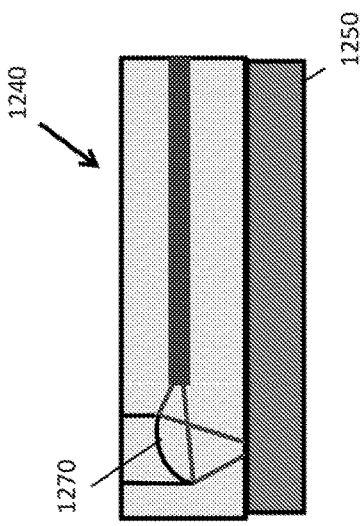

FIGS. 27-29 shows other various embodiments of integrated photonic devices 1220, 1230 and 1240 coupled to optical receiver and/or optical transmitter 1250. The coupling is via a lens 1260 and/or a mirror 1270 that may be laser written into the photonic chip, chemically wet-etched, laser ablated and subsequently polished or added through polymerisation of a previously deposited monomer.

Figure 30:
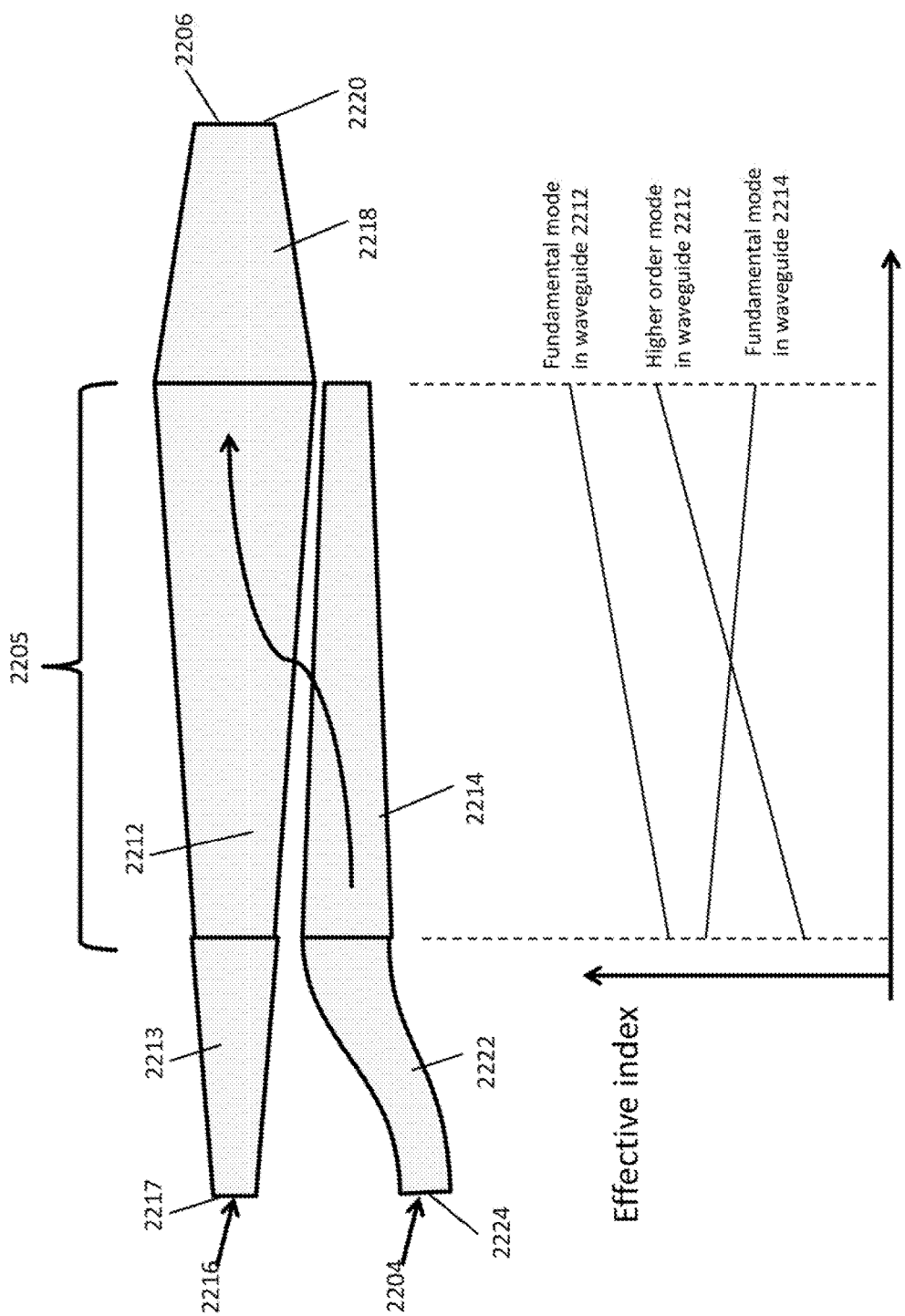
FIGS. 30 to 32 show embodiments of photonic chips.

FIG. 30 shows an elevational view of the waveguide network within an example of a photonic chip within an example of a multiplexer. When used as a multiplexer, an optical signal is launched into the lowest order optical spatial mode of waveguide 2214 via optical signal input port 2204 and the another signal is launched into the lowest order optical spatial mode of waveguide 2212 via optical signal input port 2216. The waveguide network is configured to combine the optical signals by coupling the signal into the signal waveguide 2212 while traversing a coupling region 2205, for egress via output port 2206 of waveguide 2212. In the coupling region, the waveguide 2212 and the waveguide 2214 are tapered in opposite directions, although in an alternative embodiment only one of the waveguides 2212, 2214 may be tapered. The coupling region (that is, the coupler which is in this embodiment the length of the tapers) is in the range of 5 mm to 20 mm long, however in other embodiments it may be between 1 mm and 50 mm long. The port 2206 may have optically coupled thereto a connectorized fiber pigtail for attachment to a connectorized end of the optical fiber 15. Ports 2216 and 2204 may each have optically coupled thereto a connectorized fiber pigtail for optical connection with light sources. The connectorized fiber pigtail optically coupled to port 2216 may be connected to a other optical signal source operable to generate the other optical signal, in the form of, for example, a signal modulated laser diode or generally any suitable wavelength. The connectorized fiber pigtail optically coupled to port 2204 may be connected to a light source operable to generate the optical signal, in the form of, for example, another signal modulated laser diode. While in this embodiment the optical signal and the other optical signal are co-propagating within the coupling region 2205, they may in an alternative embodiment be counter propagating. The port 2216 comprises a tapered waveguide 2213 configured for matching the optical signal spatial mode dimensions on either side of the optically transparent interface 2217 of the port 2216. The tapered region 2213 is also configured to reject light in spatial modes other than the lowest order spatial mode. The port 2204 comprises a tapered waveguide 2222 configured for matching the other optical signal spatial mode dimensions on either side of the optically transparent interface 2224 of the port 2204. The port 2206 comprises a tapered region 2218 for matching the optical signal spatial mode dimensions on either side of the optically transparent interface 2220 of the port 2206. The taper may be inwardly or outwardly flaring, depending on for example the optical fiber attached to the port 2206. The other optical signal is in the lowest order spatial mode at the optically transparent face 2220 and the optical signal is in a higher order mode at the optically transparent face 2220. FIG. 30 also shows the effective reactive indices for the lowest order spatial modes in waveguides 2212 and 2214, and the higher order monitoring light spatial mode in waveguides 2212, 2214 in the coupling region. The optical signal in the lowest order optical spatial mode in the waveguide 2214 is coupled into the higher order spatial mode of the waveguide 2212 when the effective refractive indices cross over. Consequently, at port 2206 the other optical signal is in the lowest order (fundamental) optical spatial mode ($LP_{01}$) of the waveguide 2212 and the optical signal is in a higher order optical spatial mode (e.g. $LP_{11}$, $LP_{21}$) of the waveguide 2212. The effective refractive index of the fundamental mode in the waveguide 2212 does not cross the effective refractive index of the fundamental mode in the waveguide 2214, and so the other optical signal is not coupled from the waveguide 2212 into the waveguide 2214.

Figure 31:
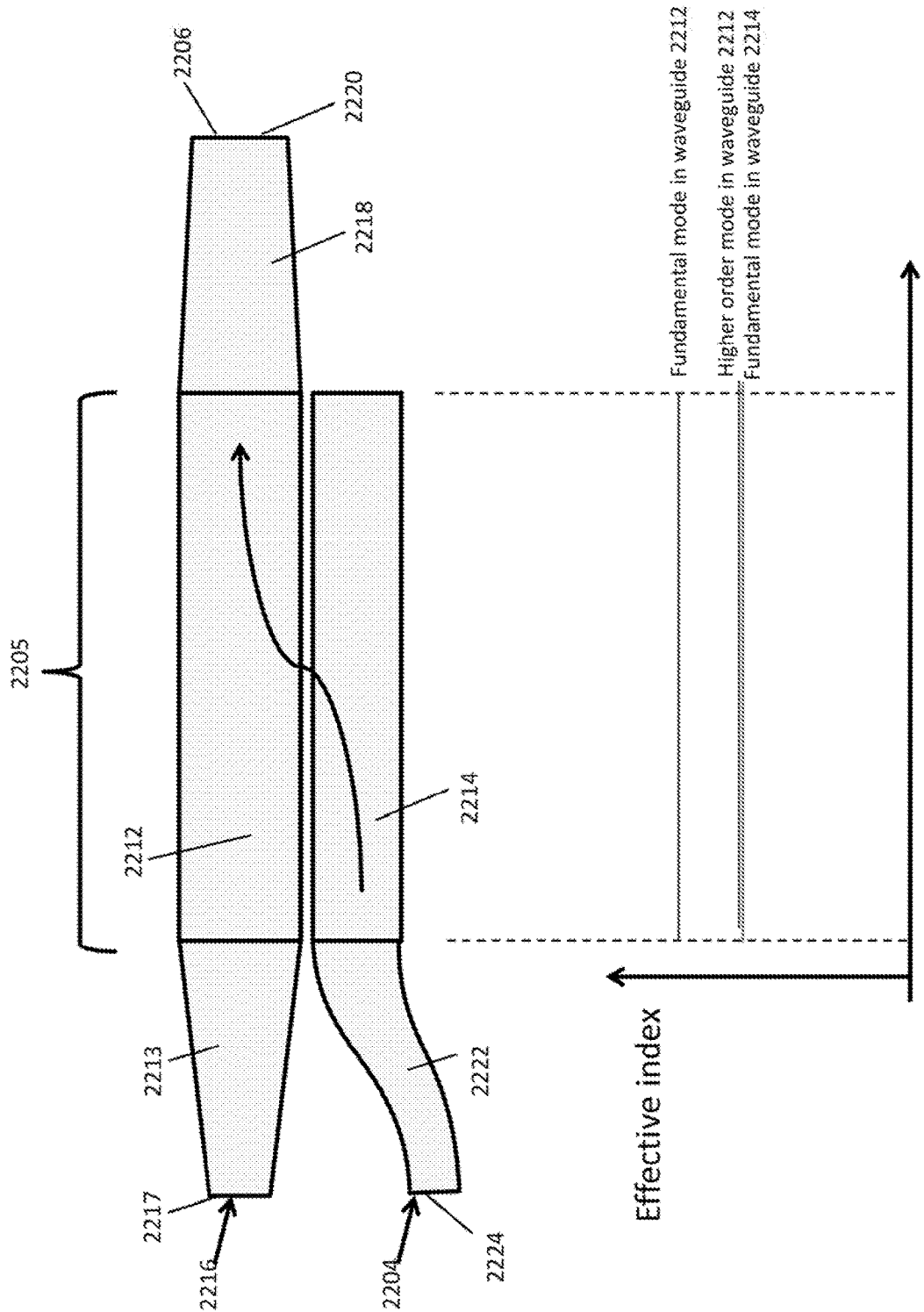

FIG. 31 shows an elevational view of the waveguide network within another example of a photonic chip within another example of a multiplexer, where parts similar in form and/or function to those in FIG. 30 are similarly numbered. In this example, however, the waveguides 2212, 2214 are not tapered in the coupling region 2205, and coupling occurs along the length of the coupling region. The effective refractive index of the higher order mode in the signal waveguide 2212 is substantial the same or the same as the refractive index of the fundamental mode in the monitoring light waveguide 2214. The ports may be coupled to optical fibers as described herein.

Figure 32:
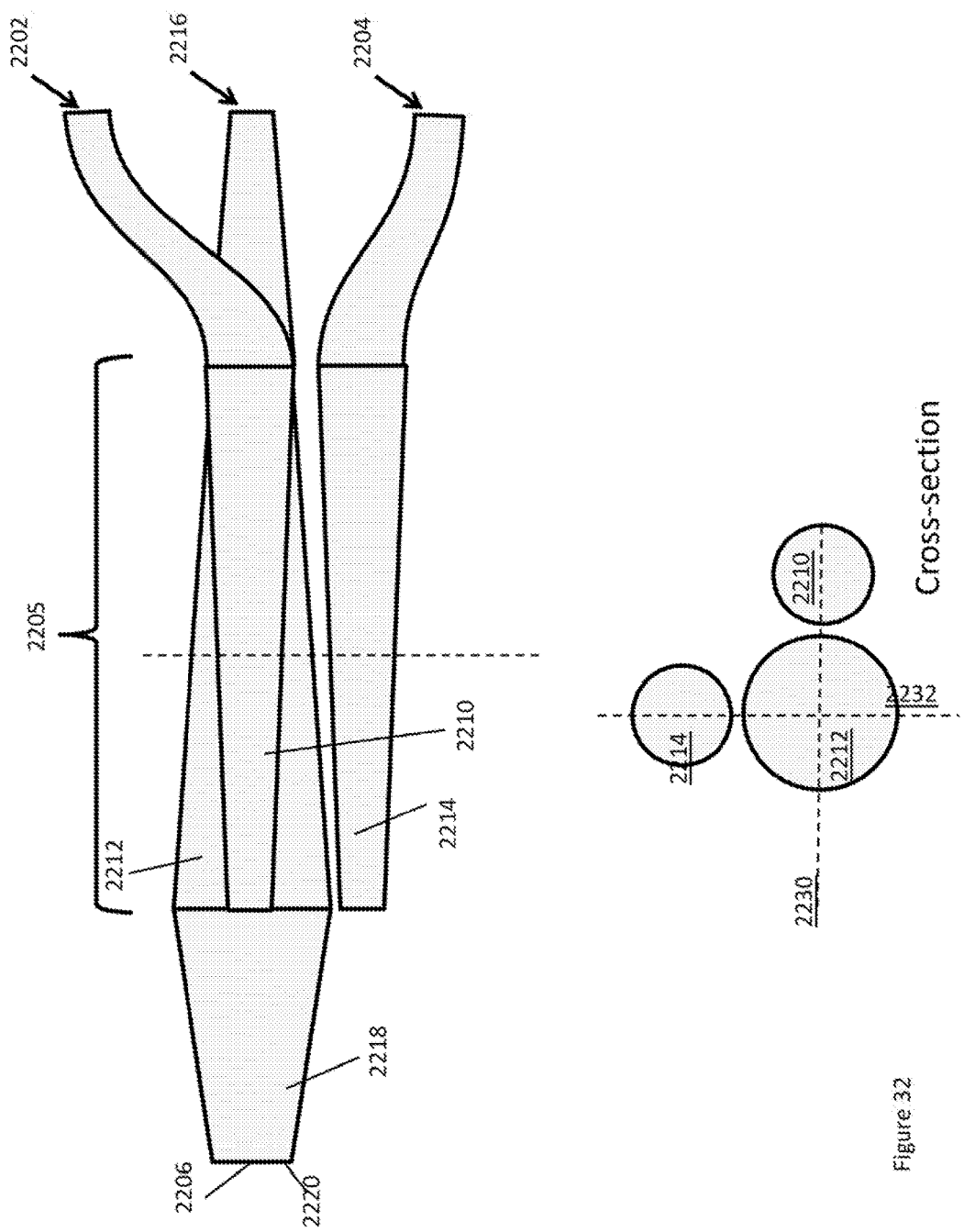

FIG. 32 shows an elevational view of a waveguide network within yet another example of a photonic chip within an example of a demultiplexer, where parts similar in form and/or function to those in FIG. 30 are similarly numbered. Port 2206 is an optical fiber link port and receives the signal in a higher order optical spatial mode, and the other signal light in the lowest order optical spatial mode (although the spatial mode order in this any other embodiments may be arbitrarily reversed). The length of the coupling region 2205 (coupler) is in the range of 5 mm and 20 mm, and in an alternative embodiment in the range of 1 mm to 50 mm. This example demultiplexer has both orientation states of a degenerate higher order mode (e.g. $LP_{11a}$ at port 2202 and $LP_{11b}$ at port 2204, for example). The waveguides in the coupling region 2205 are tapered, however they are not in all embodiments. The ports 2202, 2204, 2206, and 2216 each comprise a tapered waveguide for mode matching and mode filtering as described. The plurality of waveguides 2212, 2214, 2210 within the coupling region 2205 are not centered on a single plane. Waveguides 2214 and 2212 are centered on a first plane 2232 and waveguides 2213 and 2210 are centered on a second plane. The second plane is in this, but not all, embodiments orthogonal to the first plane. The ports may be coupled to optical fibers as described above.

A Local Area Network (LAN), computer interconnect, or data center, for example, may comprise the transmission system 10. The optical signals may be encoded using protocols including but not limited to one of the ETHERNET, INFINIBAND, FIBERCHANNEL, PCI-EXPRESS, or generally any suitable protocol compliant or not compliant to the OSI model. The optical signal may be either digital or analogue. The optical signal may comprise protocol dependant units in the form of Ethernet packets. The transmission system may have a transmission distance of between 1 m and 10 km, for example, however other embodiments may have a greater or lesser transmission distance. The LAN may be within a data center, a university LAN or may generally be used wherever transmission of a plurality of optical signals may be required. Different modes may be for different racks in the data center, for example. A node in the LAN may be serviced by an add drop multiplexer. Each spatial mode or spatial mode group may be used in place of an optical fiber, which may reduce the complexity and cost of installation.

The devices may be used to retrofit deployed multimode fibers to increase the supported data rate and number of optical signal channels. This may be as simple as installing the multiplexers and demultiplexers and adding add drop multiplexers as required. Replacement of the fiber may not be necessary, saving money.

There is, for practical purposes, effectively no coupling between spatial modes or spatial mode groups and consequently intermodal dispersion may be significantly reduced or eliminated in embodiments.

A single multimode optical fiber may be used for bidirectional transmission of optical signals. At least one of the spatial modes or spatial mode groups may be for transmission in a direction along the multimode fiber, and at least one other of the spatial modes or spatial mode groups may be for transmission in another direction along the multimode fiber.

Each mode group may be used in combination with wavelength division multiplexing (WDM). The system may support a wavelength range of between 10 nm and 400 nm, for example. Wavelengths may be, for example, centered at one of the typical telecommunication wavelength bands, for example the O, E, S, C, L and U-bands. Nominally single-mode optical fibers could be operated at shorter 'multimode' wavelengths. Example wavelengths include but are not limited to 850 nm, 1310 nm or 1550 nm. The plurality of optical signals may have different optical carrier wave wavelengths. There may be more optical signals in the plurality of optical signal than spatial modes in the plurality of spatial modes. Different optical signals in the same spatial mode may be isolated with a wavelength division add drop multiplexer optically coupled to a spatial mode add drop multiplexer. For example, the optical transmitters 24, 26, 28 may each comprise a plurality of optical transmitters emitting light having different wavelengths. The wavelength division multiplexing may be course wavelength division multiplexing, or dense wavelength division multiplexing.

The photonic devices disclosed herein may generally comprise an optical material in the form of glass or generally any suitable material. The integrated photonic chips disclosed herein are fabricated by writing a network of waveguides within the optical material using an ultrafast laser in the form of for example a femtosecond laser. Generally, but not necessarily, the glass comprises a glass chip. The laser light is generally focused using an objective lens into the optical material to generate a focal spot of sufficient intensity to form a plasma resulting in nonlinear optical breakdown of the optical material. The plasma is of a temperature of several thousand degrees Kelvins, and forms a melted ball of optical material having a diameter of around 50 µm. The rapid cooling, compared to the slow cooling when the optical material was first formed, results in a different refractive index at the focal spot. This alters the structure of the glass. The focal spot (or optical material) is translated to form each waveguide in the waveguide network. The dimensions and index contrast of the waveguides 210, 213 and 212 may be changed by changing the laser pulse energy and the rate at which the focal spot is translated. Laser power and rate of translation parameters may be adjusted for the required degree of waveguide tapering within the photonic device 200. The waveguides are relatively low loss and exhibit relatively high mode purity. The integrated photonic chip may comprise waveguides that are tapered. The waveguides have three-dimensional freedom in their location within the integrated photonic chip.

Examples of multimode fiber that may be within the multimode optical fiber link include but are not limited to 62.5 µm and 50 µm core-diameter multimode optical fibers, step index multimode fibers, graded index multimode fibers (examples of which include but are not limited to OM1 and OM2/3/4), and fibers that support only two, three or more modes. The multimode optical fiber link may comprise multimode fiber with a circular, elliptical, or square core, for example.

Now that embodiments have been described, it will be appreciated that some embodiments have some of the following advantages:

Multiplexing optical signals onto spatial modes may increase the data carrying capacity of an optical fiber link.

Spatial mode dispersion may be reduced, increasing the usable span of a multimode optical fiber link.

Signals may be added or dropped at a network node using a device that may be simple to install.

Existing multimode optical fiber links may be retrofitted to improve their performance.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. An optical signal transmission system comprising:
   a multimode optical fiber link for transmission of a plurality of optical signals in a plurality of spatial modes supported by the multimode optical fiber link; and
   a spatial mode add drop multiplexer comprising a multimode optical fiber input optically coupled to the multimode optical fiber link, a multimode optical fiber output optically coupled to the multimode optical fiber link, and a glass photonic chip comprising a waveguide network comprising a multimode waveguide input at which the multimode optical fiber input is optically coupled and a multimode waveguide output at which the multimode fiber output is optically coupled, wherein the spatial mode add drop multiplexer is configured for at least one of coupling into the multimode optical fiber link an optical signal of the plurality of optical signals into a spatial mode of the plurality of spatial modes and selectively coupling out of the multimode optical fiber link the optical signal of the spatial mode.

2. A system defined by claim 1 wherein the spatial mode add drop multiplexer is configured for selectively coupling out of the multimode optical fiber link and into an optical fiber the optical signal of the spatial mode.

3. A system defined by claim 1 wherein the multimode optical fiber input comprises a few mode input optical fiber.

4. A system defined by claim 1 wherein the multimode optical fiber output comprises a few mode output optical fiber.

5. A system defined by claim 1 wherein the waveguide network comprises at least one of a mode selective tapered coupler, a mode selective photonic lantern, and an asymmetric directional coupler.

6. A system defined by claim 1 wherein the waveguide network is a laser written waveguide network.

7. A system defined by claim 1 comprising a plurality of spatial mode add drop multiplexers optically coupled to the multimode optical fiber link, wherein the spatial mode add drop multiplexer is one of the plurality of spatial mode add drop multiplexers.

8. A system defined by claim 1 comprising a spatial mode multiplexer optically coupled to the multimode optical fiber link and configured for coupling into the multimode optical fiber link at least some of the plurality of optical signals into at least some of the plurality of spatial modes.

9. A system defined by claim 8 wherein the spatial mode multiplexer is optically coupled to a plurality of optical transmitters.

10. A system defined by claim 1 comprising a spatial mode de-multiplexer coupled to the multimode optical fiber link and configured for selectively coupling out of the multimode optical fiber link at least some of the plurality of optical signals in at least some of the plurality of spatial modes.

11. A system defined by claim 10 wherein the spatial mode de-multiplexer is optically coupled to a plurality of optical receivers.

12. A system defined by claim 1 wherein the spatial mode add drop multiplexer is for at least one of coupling into the multimode fiber link the optical signal of the plurality of optical signals into a spatial mode group of a plurality of spatial mode groups supported by the multimode optical fiber link and selectively coupling out of the multimode optical fiber link the optical signal of the spatial mode group.

13. A system defined by claim 12 comprising a spatial mode add drop de-multiplexer configured for selectively coupling out of the multimode optical fiber link the optical signal of the spatial mode group.

14. A method for transmitting a plurality of optical signals, the method comprising:
using a spatial mode add drop multiplexer coupled to a multimode optical fiber link that supports a plurality of spatial modes to either couple into the multimode optical fiber link an optical signal of the plurality of optical signals into a spatial mode of the plurality of spatial mode groups or coupling out of the multimode optical fiber link the optical signal of the spatial mode, wherein the spatial mode add drop multiplexer comprises a multimode optical fiber input optically coupled to the multimode optical fiber link, a multimode optical fiber output optically coupled to the multimode optical fiber link, and a glass photonic chip comprising a waveguide network comprising a multimode waveguide input at which the multimode optical fiber input in optically coupled and a multimode waveguide output at which the multimode fiber output is optically coupled, wherein the spatial mode add drop multiplexer is configured for at least one of coupling into the multimode optical fiber link an optical signal of the plurality of optical signals into a spatial mode of the plurality of spatial modes and selectively coupling out of the multimode optical fiber link the optical signal of the spatial mode.

15. A method defined by claim 14 wherein the spatial mode add drop multiplexer can be used to couple out of the multimode optical fiber link and into an optical fiber the optical signal.

16. A method defined by claim 14 wherein the waveguide network comprises at least one of a mode selective tapered coupler, a mode selective photonic lantern, and an asymmetric directional coupler.

17. A method defined by claim 14 wherein the waveguide network is a laser written waveguide network.

18. A method defined by claim 14 comprising a plurality of spatial mode add drop multiplexers coupled to the multimode optical fiber link wherein the spatial mode add drop multiplexer in one of a plurality of spatial mode add drop multiplexers.

19. A method defined by claim 14 comprising using a spatial mode multiplexer coupled to the multimode optical fiber link to couple into the multimode optical fiber at least some of the plurality of optical signals into at least some of the plurality of spatial modes.

20. A method defined by claim 14 comprising using a spatial mode de-multiplexer coupled to the multimode optical fiber link to selectively couple out of the multimode optical fiber link at least some of the plurality of optical signals in at least some of the plurality of spatial modes into a plurality of respective optical fibers.

\* \* \* \* \*